(12) United States Patent
Brennan et al.

(10) Patent No.: US 9,272,791 B2
(45) Date of Patent: Mar. 1, 2016

(54) AIRCRAFT REFUEL SYSTEM PIPING

(75) Inventors: Susan Elizabeth Brennan, Dundalk (IE); Clive French, Nottingham (GB); James Dudley Clark, Leeds (GB)

(73) Assignee: Airbus Operations Limited, Bristol (GB)

(*) Notice: Subject to any disclaimer, the term of this patent is extended or adjusted under 35 U.S.C. 154(b) by 1140 days.

(21) Appl. No.: 13/137,094

(22) Filed: Jul. 20, 2011

(65) Prior Publication Data

US 2012/0025025 A1 Feb. 2, 2012

(30) Foreign Application Priority Data

Jul. 29, 2010 (GB) .................................. 1012737.1

(51) Int. Cl.
| | |
|---|---|
| *F16L 9/14* | (2006.01) |
| *B64D 39/00* | (2006.01) |
| *B64D 39/04* | (2006.01) |
| *F16L 9/00* | (2006.01) |
| *F16L 9/147* | (2006.01) |

(52) U.S. Cl.
CPC .................. *B64D 39/04* (2013.01); *F16L 9/006* (2013.01); *F16L 9/147* (2013.01)

(58) Field of Classification Search
CPC ........... B64D 39/04; F16L 9/006; F16L 9/147
USPC ............... 138/140–153, DIG. 11; 244/135 A; 428/34.1–36.92
See application file for complete search history.

(56) References Cited

U.S. PATENT DOCUMENTS

| | | | | |
|---|---|---|---|---|
| 3,570,545 | A * | 3/1971 | Benteler ........................ | 138/143 |
| 4,131,701 | A * | 12/1978 | VanAuken ..................... | 138/143 |
| 4,137,949 | A * | 2/1979 | Linko et al. .................... | 138/125 |
| 4,706,910 | A | 11/1987 | Walsh et al. | |
| 4,863,121 | A | 9/1989 | Savill | |
| 5,445,095 | A | 8/1995 | Reed et al. | |
| 5,542,630 | A * | 8/1996 | Savill ............................. | 244/200 |
| 6,193,191 | B1 * | 2/2001 | Falcimaigne et al. ......... | 244/200 |

(Continued)

FOREIGN PATENT DOCUMENTS

| | | |
|---|---|---|
| EP | 0 505 759 | 9/1992 |
| EP | 1 857 722 | 11/2007 |

(Continued)

OTHER PUBLICATIONS

UK Search Report dated Nov. 24, 2010 in GB 1012737.1.

(Continued)

*Primary Examiner* — Patrick F Brinson
*Assistant Examiner* — Matthew Lembo
(74) *Attorney, Agent, or Firm* — Nixon & Vanderhye P.C.

(57) ABSTRACT

The invention provides a pipe 100 for an aircraft refuel system, the pipe comprising an outer section 200 making up a pipe wall, the pipe wall having an outer and inner 230 surface, a surface texture 310 on the inner pipe wall surface, the surface texture comprising projections 311 projecting inwards from the inner pipe wall surface towards the centre of the pipe. The surface texture may be riblets 311 and may be coated with an anti-bacterial coating 340. The surface texture may be formed from a layer of conductive material, in the form of a foil 300. The outer section 200 may be made from a non-conductive, preferably composite material. The invention also provides a method of manufacturing piping for an aircraft refuel system using a mandrel 400.

19 Claims, 6 Drawing Sheets

(56) References Cited

U.S. PATENT DOCUMENTS

| | | | |
|---|---|---|---|
| 6,345,791 B1 | 2/2002 | McClure | |
| 6,820,654 B2 * | 11/2004 | Lindsay | 138/153 |
| 7,041,363 B2 * | 5/2006 | Krohmer et al. | 428/209 |
| 7,516,920 B2 * | 4/2009 | Schroeder | 244/135 A |
| 7,740,077 B2 * | 6/2010 | Davis | 166/381 |
| 2007/0098939 A1 * | 5/2007 | Inaba | 428/36.9 |
| 2009/0158799 A1 * | 6/2009 | Takeishi et al. | 72/97 |
| 2010/0263761 A1 * | 10/2010 | Niccolls et al. | 138/146 |
| 2011/0073710 A1 * | 3/2011 | Rawlings | B64C 21/10 244/130 |
| 2011/0284117 A1 * | 11/2011 | Ansell et al. | 138/140 |

FOREIGN PATENT DOCUMENTS

| | | |
|---|---|---|
| EP | 1 900 989 | 3/2008 |
| FR | 2 657 945 | 8/1991 |
| JP | 2003-240485 | 8/2003 |
| WO | WO 93/09370 | 5/1993 |
| WO | WO 02/42510 | 5/2003 |
| WO | WO 2009045867 A1 * | 4/2009 |

OTHER PUBLICATIONS

M.J. Walsh et al, "Drag Characteristics of V-Groove and Transverse Curvature Riblets" NASA Langley, 1980, pp. 168-184.

M.J. Walsh, "Riblets as a Viscous Drag Reduction Technique" *AIAA Journal*, vol. 21, No. 4, Apr. 1983, pp. 485-486.

J.J. Rohr et al, "A comparison of the drag-reducing benefits of riblets in internal and external flows" *Experiments in Fluids* 13, 1992, pp. 361-368.

K.N. Liu et al, "Drag Reduction in Pipes Lined with Riblets" *AIAA Journal*, vol. 28, No. 10, Oct. 1990, pp. 1697-1698.

G.V. Enyutin et al, "Drag Reduction in Riblet-Lined Pipes" *Fluid Dynamics*, vol. 30, No. 1, 1995, pp. 45-48.

K.N. Liu et al, "Drag Reduction in Pipes Lined with Riblets" Structure of Turbulence and Drag Reduction, IUTAM Symposium Zurich/Switzerland 1989, pp. 545-551.

S. Nakao, "Effects of Riblet Bends on Pipe Flows" *Applied Scientific Research* 54, 1995, pp. 237-247.

D.W. Bechert, "Experiments with three-dimensional riblets as an idealized model" *Experiments in Fluids* 28, 2000, pp. 403-412.

Y. Peet et al, "Turbulent Drag Reduction using Sinusoidal Riblets with Triangular Cross-Section" 38$^{th}$ AIAA Fluid Dynamics Conference and Exhibit, Jun. 2008, pp. 1-9.

D. Nepal et al, "Strong Antimicrobial Coatings: Single-Walled Carbon Nanotubes Armored with Biopolymers" *NANO Letters*, vol. 8, No. 7, 2008, pp. 1896-1901.

S. Okamoto et al, "Drag Reduction in Pipe Flow with Riblet" The Japan Society of Mechanical Engineers Journal vol. 68, 2002, pp. 94-100.

* cited by examiner

Fig.1

(PRIOR ART)

AIRCRAFT REFUEL SYSTEM PIPING

This application claims priority to GB Application No. 1012737.1, filed 29 Jul. 2010, the entire contents of which is hereby incorporated by reference.

BACKGROUND OF THE INVENTION

The present invention concerns piping used in aircraft refuel systems. More particularly, this invention concerns a pipe comprising an outer section making up a pipe wall, the pipe wall having an outer and inner surface. The invention also concerns a method of manufacturing piping for an aircraft refuel system.

Figure 1:
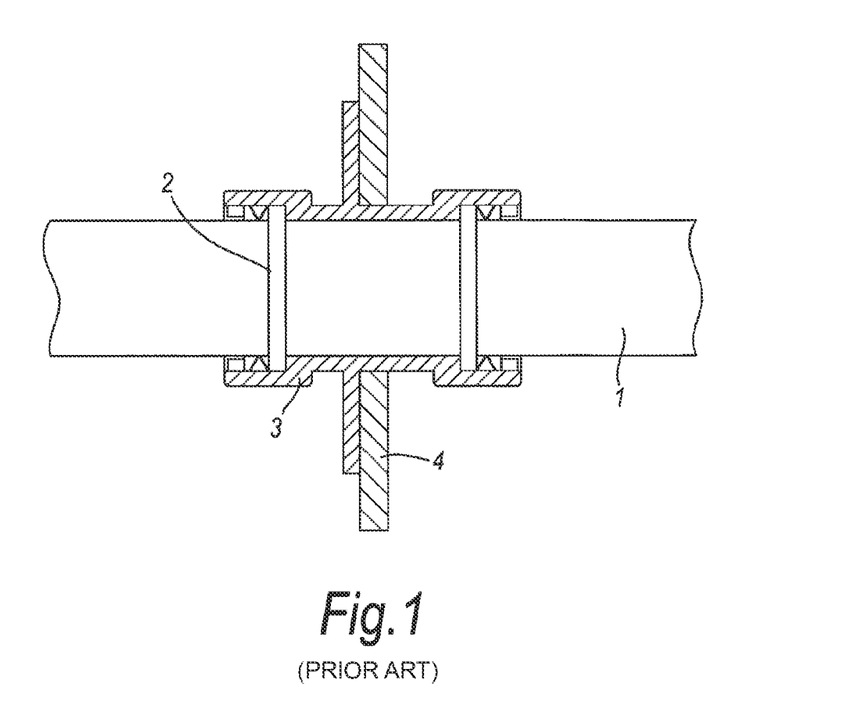
FIG. 1 shows a plan sectional view of a prior art refuel pipe configuration.

Conventional refuel piping is manufactured from aluminium and extruded in lengths to suit the required fuel tank geometry. Brackets are used, wherever needed, in order to brace pipework. Fittings and adaptors are used to accommodate fuel system equipment, such as valves. FIG. 1 shows a typical prior art fuel system piping configuration. This configuration includes a high number of parts, has a high weight and is costly to manufacture.

In the piping configuration of FIG. 1, the manufacturing method used and the materials used result in internal skin imperfections on the inside of the pipe. This increases the roughness of the inside of the pipe and increases the skin friction as the wetted area of the inside of the pipe is increased. In order to minimise the skin friction in the pipes, the inside of the pipe bore can be polished. However, this manufacturing process is not particularly practicable as the cost of the polishing process is high and it is not possible to achieve a perfectly smooth bore pipe.

Any skin friction generated in the pipes, results in inefficiencies in the refueling process. This makes refueling slower, resulting in increased turnaround time and subsequent cost for the aircraft operator. The refuel equipment also requires more power for a given speed of refuel. This is sometimes not possible and, in any case, increases the cost for the refueling operator.

The present invention seeks to mitigate the above-mentioned problems. Alternatively or additionally, the present invention seeks to provide an improved pipe for an aircraft refuel system. Alternatively or additionally, the present invention seeks to provide an improved method for manufacturing pipe for an aircraft refuel system.

SUMMARY OF THE INVENTION

The present invention provides, according to a first aspect, a pipe for an aircraft refuel system, the pipe comprising an outer section making up a pipe wall, the pipe wall having an outer and inner surface, a surface texture on the inner pipe wall surface, the surface texture comprising projections projecting inwards from the inner pipe wall surface towards the centre of the pipe. The surface texture enables the drag between the fuel flowing in the pipe and the inner pipe wall to be reduced. The surface texture enables the refuel process to occur more quickly and/or using less electrical power.

The pipe may run from a refuel valve assembly to a fuel tank in the aircraft.

The pipe may be dimensioned according to the fuel flow rate and pressure it is expected to experience in use. The pipe may have a bore (internal) diameter of 2.5 inches or less. The pipe may have a bore diameter of 2 inches, or even 1.5 inches or less. As the pipe bore diameter is reduced, the surface texture has a greater effect on the fuel, as the ratio of fuel in contact with the surface texture is increased. This gives a larger ratio of laminar boundary layer fuel compared to turbulent freestream flow and therefore provides a more efficient fuel flow velocity profile.

Preferably, the surface texture comprises a texture defining features extending longitudinally along the length of the pipe. The longitudinally extending features may comprise grooves, channels, troughs, projections or peaks. More preferably, the surface texture comprises a series of riblets, the riblets being defined as projections extending longitudinally along the length of the pipe.

The use of riblets in the pipe has various effects on the fuel flow through the pipe. By amending the interior wall surface texture, the skin friction of the fuel against the interior wall surface is reduced and hence the drag is reduced. The use of riblets also reduces the shear stress in the fuel. This means that the boundary layer fuel velocity and total fuel velocity are increased, allowing a faster refuel time. This reduces aircraft turnaround times and gives a cost benefit to the aircraft operators. In addition, less power is needed from a refuel bowser or hydrant in order to pump fuel into the aircraft tanks. This is especially useful, when refueling in remote airfields where the refuel ground equipment may have less power due to age, wear or less frequent maintenance.

As the riblet projections extend longitudinally along the pipe, this encourages the fuel to flow longitudinally. This inhibits cross flow of fuel, tangentially to the pipe wall, and inhibits the generation of streamwise vortices. The sub-viscous boundary layer is thereby manipulated and laminar boundary layer flow is promoted. This means that less Electro Static Discharge (ESD) is generated in the fuel (as the fuel is less turbulent) and so less charge is allowed to build up in the fuel. In addition, the rate at which the fuel "relaxes" (dissipates the ESD) is increased with the presence of riblets. This allows the aircraft to be refueled at a higher rate, whilst still keeping the ESD in the fuel to within acceptable levels.

Riblets may be used in bends of the pipe. Here, the riblets improve the flow characteristics of the fuel around bends and thus can mitigate pressure losses in the non-linear pipework.

In addition, the use of riblets acts to lessen surge pressures in the pipe and reduces the effects of high energy large scale outer flow structures, such as eddies.

Preferably, the ratio of the height of the riblets to the spacing (pitch) of the riblets is approximately 2:3.

Preferably, the surface texture is formed from a layer of conductive material, for example in the form of a foil, preferably comprising silver or gold or a combination of silver and gold. Having the surface texture made of a conductive material allows ESD generated to be discharged to earth. Silver reacts with sulphur in fuel and so it may be that a foil comprising silver is provided with an additional layer on top of the foil layer.

Preferably, the outer section is made from a non-conductive material. Having the outer section made of a non-conductive material prevents heat transfer through the pipe. It also allows a surface texture to be formed from conductive material, whilst also keeping the weight of the pipe low.

More preferably, the outer section is made from a composite material. This can further minimise the weight of the pipe compared to a metallic structure. The weight saving would be proportional to the pipe length. The pipe would also be semi-flexible and not require bonding to the aircraft. Hence, bondable multiple pipe runs and single piece pipes can be created, without the need for the support and attachment configuration of FIG. 1. This provides an additional weight saving.

Preferably, the projections have a substantially triangular cross-section.

Preferably, the cross-section of the projections is not constant along the length of the pipe.

More preferably, the height of at least one projection varies along the length of the projection, such that the projections undulate up and down along the pipe. In other words, the apex of a projection defines a continuous, undulating ridge comprising mountains and valleys. This enables the riblets to better manipulate the boundary layer.

More preferably, the peak of at least one projection varies position transversely along the length of the projection, such that the projections undulate sideways along the pipe. This allows the fuel flow to be guided into an oscillatory motion to give an oscillatory spanwise component of flow near the pipe wall. This gives a reduction in cross flow turbulence intensity and a drag reduction. It is understood that cross flow turbulences are reduced due to the riblets mimicking the oscillatory motion of the pipe wall. The drag reduction can be maximised by optimising the riblet wave length (the distance along the riblet between one sideways dip or crest of the undulating riblet wave and the next corresponding dip or crest).

Preferably, the surface texture is coated in an anti-bacterial coating. This prevents microbial contamination and sedimentation, especially in areas in the pipe where water might collect, for example when fuel is not being pumped through the pipe. Preventing microbial contamination is especially important when using a surface texture, such as riblets, as the surface texture increases the surface area inside the pipe and gives more opportunity for bacterial growth. Bacterial growth can lead to acid being produced which can cause the surface texture to become eroded. The coating should be non-reactive with fuel, be durable given the pressures and flow rate it is likely to experience in use and have a low surface roughness. An SWNT (single-walled carbon particle nanotubes) coating could be used. A layer of hexachromate could also be used. Traditional anti-bacterial coatings are made from silver. However, it is known that silver reacts with the sulphur in fuel. Therefore, silver is not a suitable anti-bacterial coating.

The invention also provides an aircraft refuel system comprising a pipe as described above.

The invention also provides an aircraft comprising a pipe as described above.

According to a second aspect of the invention, there is also provided a method of manufacturing piping for an aircraft refuel system, the method comprising the steps of applying a surface texture layer around a mandrel, then applying an outer pipe section layer around the surface texture layer, and then removing the mandrel. The use of a mandrel allows the different layers of the pipe to be applied in turn to the mandrel, such that when the mandrel is removed, a layered pipe is produced. The use of a mandrel negates the need for extruding the pipe, as in the prior art. This allows a surface texture, such as riblets, with a varying cross-section to be produced.

Preferably, the surface texture layer is in the form of a foil which is wrapped around the mandrel. Having the surface texture on a foil, for example by being applied through embossing, allows the surface texture to be applied easily to the pipe.

Preferably, the surface texture layer has an antibacterial coating applied to it, for example, by immersion or by spraying.

Preferably, suction pressure is applied to the mandrel to retain the surface texture layer on the mandrel.

Preferably, the outer pipe section layer is applied around the surface texture layer by winding composite un-cured tape around the surface texture layer and wherein the un-cured composite material is then cured. This provides a simple and effective way of applying the composite outer layer of the pipe around the mandrel.

Preferably, the mandrel is formed of inner and outer sections, wherein the surface texture layer and outer pipe section layer are applied around the outer section, and wherein the inner section can be removed from inside of the outer section. This makes removal of the mandrel easier.

Preferably, the outer mandrel section is at least partially made from open cell foam. This allows gasses to pass through the mandrel and allow suction pressure to be applied to the surface texture layer and allow out-gassing removal during the curing process.

Preferably, the outer mandrel section is made up from at least two segments linked together, wherein, upon removal of the inner mandrel section, a first segment is removed by moving it in a direction towards the centre of the pipe, and wherein, upon removal of the first segment, the second segment is easily removed. This makes removal of the outer mandrel section easier.

Preferably, the inner mandrel section has at least one flattened portion on its outer surface and wherein the first segment has a corresponding flattened portion on its inner surface, such that the inner and outer mandrel sections cannot rotate with respect to each other.

A refuel valve assembly is described and claimed in UK patent application entitled "A Refuel Control System and Method of Refuelling" with agent's reference "XA3065", having the same filing date as the present application. The contents of that application are fully incorporated herein by reference. The claims of the present application may incorporate any of the features disclosed in that patent application. In particular, the claims of the present application may be amended to include features relating to configuration of the refuel valve assembly.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 2b shows an isometric view of the riblet design of FIG. 2a;

DETAILED DESCRIPTION

FIG. 1 shows a sectional view through a prior art refuel pipe configuration. Two sections of pipe 1 are joined by a coupling 3 either side of a rib 4. Each section of pipe 1 has an end flange 2 which is held within the coupling 3. The coupling extends through the rib 4 thereby joining the two sections of pipe 1. This prior art pipe configuration is made of extruded aluminium.

Figure 2A:
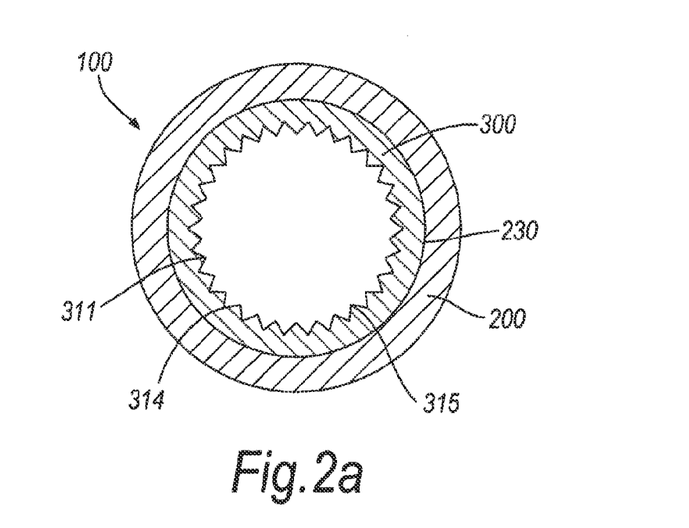
FIG. 2a shows a schematic cross-sectional view of a pipe according to a first embodiment of the invention.

FIG. 2a shows a cross section through a pipe according to a first embodiment of the invention. The pipe is depicted generally as 100. The pipe 100 has an outer composite, non-conductive layer 200 and an inner riblet foil layer 300. The riblet foil layer 300 is made from a mixture of silver and gold and on the inner surface has a series of triangular grooves, thereby forming a riblet pattern 310. The individual riblets of the riblet pattern 310 are labelled as 311 and each riblet has a peak 315 with the troughs of the riblet pattern being labelled as 314. It can be seen in FIG. 2a that the level of the troughs 314 of the riblets does not extend down to the outer surface of the riblet foil 300/inner surface of the outer composite layer 200, labelled as 230. The level of the troughs 314 extends down to approximately halfway down the height of the riblet foil layer 300.

Figure 2B:
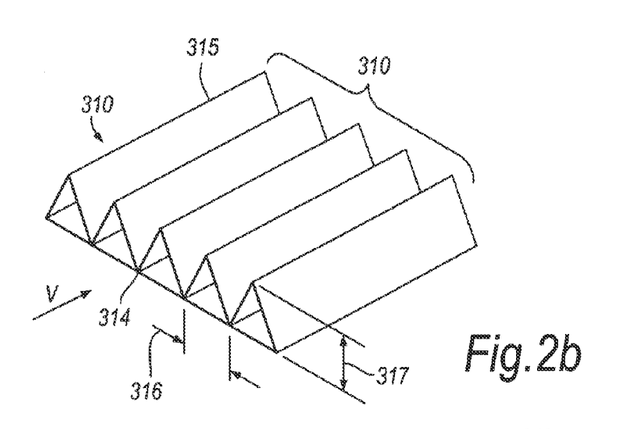

FIG. 2b shows an isometric view of the riblet pattern 310 of FIG. 2a. Here, just the riblets 311 themselves are shown, i.e. from the level of the troughs 314 up to the level of the peaks 315. The rest of the riblet foil 300 is not shown. It can be seen that the riblets 311 extend longitudinally along the pipe parallel to the streamwise flow (represented by V). The riblets have a height, i.e. the distance away from the wetted surface into the fluid normal to the surface, of 317 and a spacing to the next riblet, i.e. the distance tangent to the local surface and perpendicular to the flow direction, of 316.

In addition, the riblet foil 300 has an anti-bacterial coating 340 (not shown) coated on the riblets 311.

The pipe diameter is chosen in order to cope with the required fuel flow rate and the fuel pressure required and also to minimize system weight. In the embodiment shown in FIGS. 2a and 2b, the pipe diameter is 2 inches (50 mm). The riblets have a height (h) 317 of 1 mm and a spacing (s) 316 of 1.5 mm. The height and the spacing are generally considered as non-dimensionalised values with respect to the pipe diameter, flow kinematic velocity and flow shear velocity. Non-dimensionalised height and spacing are calculated as follows:

$$h^+ = h \cdot u^*/v \text{ and } s^+ = s \cdot u^*/v$$

where:
$u^*$=flow shear velocity=$\mu \cdot du/dy$
$v$=flow kinematic velocity=$\mu/\rho$
and where:
$\mu$=dynamic viscosity of the fluid (for jet fuel, this is 7.9 centistokes)
$\rho$=fluid density
$u$=fluid velocity
$y$=height of the fluid boundary layer.

In this example, $h^+=10$ and $s^+=15$.

In general, the height of the riblets may be between 0.5 mm and 1.5 mm, and the spacing between 0.75 mm and 2.25 mm.

It is to be noted that in the refuel pipes, a high fuel flow and high pressure are experienced. The Reynolds number of the fuel flow is considered high at approximately 100,000. It is known that friction factors decrease when riblets are used at high Reynolds numbers and therefore riblets present in this embodiment of the invention can give rise to a 6 to 12% drag reduction. The riblets 311 are designed to manipulate the sub-viscous boundary layer within the pipe.

FIGS. 4a to 4h show the various stages in the manufacture of a pipe according to embodiments of the invention. In the case of the embodiment of FIGS. 2a and 2b, this pipe could also be formed by extrusion as the riblets have a constant cross-section. However, other embodiments of the invention, as will be described later, do not have a constant cross-section riblet profile. For these pipes a new method of manufacture must be used and this will be described here.

Figure 4A:
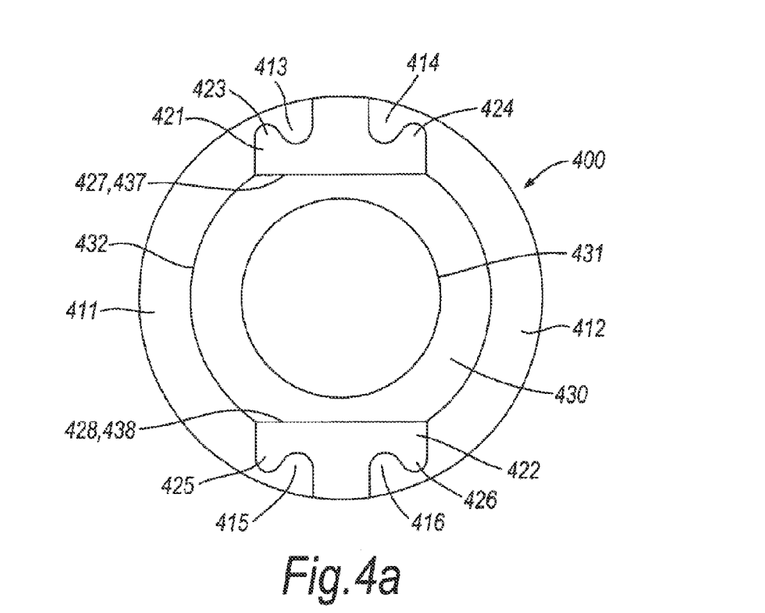
FIGS. 4a to 4h show various cross-sectional views of the pipe of FIGS. 2a and 2b, during manufacture.

FIG. 4a shows a mandrel assembly 400. The mandrel assembly has an inner mandrel 430 formed of steel. The inner mandrel 430 is in the general form of a ring with an inner circular profile 431 and an outer substantially circular profile 432. However the outer profile is slightly flattened from a circle shape at the top and bottom 437, 438.

Surrounding the inner steel mandrel 430 are two outer shell formers 411, 412. These shell formers 411,412 are made of an open cell foam and generally take the form of a curve, with the inner profiles matching the curvature of the outer circular profile of the inner mandrel 430 such that the two shell formers can be placed on either side of the inner mandrel 430, against the circular profile side sections. The shell formers 411, 412 extend between the flattened top and bottom 437, 438. At each end is a notch extending outwardly from the inner surface of the shell formers towards the outer surface. Adjacent each notch is a notch projection 413, 414, 415, 416 extending inwardly into the centre of the mandrel assembly.

The two shell formers are joined by two key portions 421, 422. These key portions 421, 422 are made of an open cell foam and each has a flattened portion 427, 428. These flattened portions rest on the top and bottom flattened portions 437, 438 of the inner steel mandrel 430. The key portions have corresponding notches and notch projections 423, 424, 425 and 426 in order to link with the notch projections 413, 414, 415, 416 of the shell formers and connect the two shell formers 411, 412.

Hence the assembled mandrel assembly 400 comprises, generally, an inner steel mandrel ring 430 and an outer open cell foam ring.

After the mandrel assembly has been assembled, it is held at either end central to the mandrel axis.

An anti-bacterial coating 340 (not shown) is then applied to the riblet pattern 310 surface of the riblet foil 300 by immersion or spraying, in order to achieve an even distribution of coating.

Figure 4B:
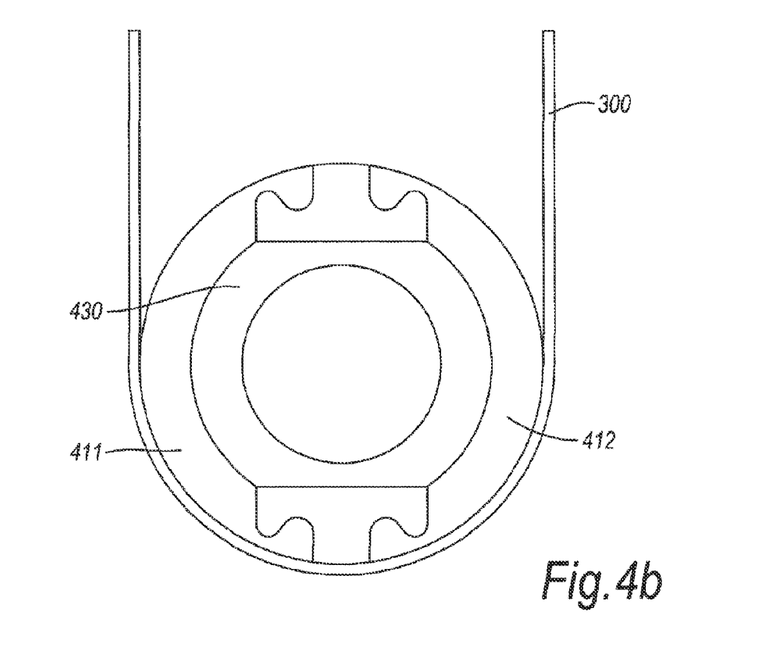

The next stage of the manufacture of the pipe is to wrap the riblet foil 300 around the outer shell formers 411, 412. The riblet foil 300 is applied with the anti-bacterial coating 340 and riblet pattern 310 facing inwards. The riblet foil 300 is then retained on the mandrel assembly 400 by use of suction pressure applied to the ends of the mandrel assembly. As the shell formers 411,412 and key portions 421,422 are made from an open cell foam, this allows free passage of air through the outer ring to allow the suction pressure to hold the riblet foil 300 in place. This is shown in FIG. 4b.

Figure 4C:
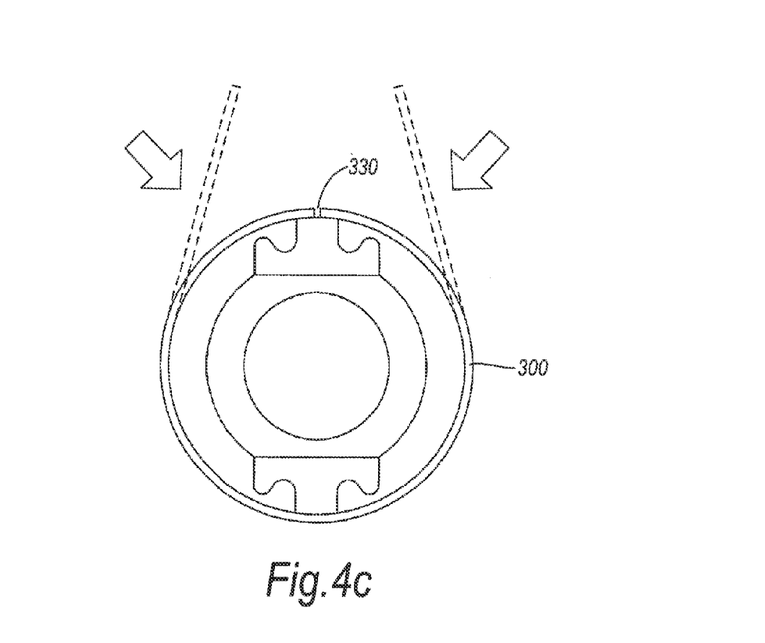

As shown in FIG. 4c, the riblet foil 300 is then formed into a shape taking the outer circumference of the mandrel assembly 400. The riblet foil 300 is then cut to form a butt joint 330.

Figure 4D:
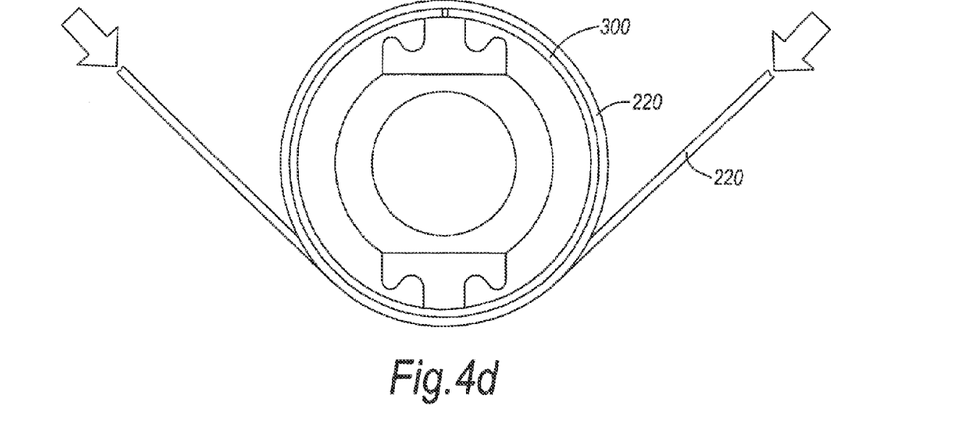

Once the riblet foil 300 is in place, the composite layer 200 of the pipe can now be applied. This is shown in FIG. 4d. The outer section 200 is formed of a tape layered composite 210 applied by wrapping a tape 220 around the riblet foil 330. The tape 220 is then cured in the normal way of composite curing. It is to be noted that the use of the open cell foam in the shell formers 421, 422 allows the removal of out-gassing during the cure process.

Figure 4E:
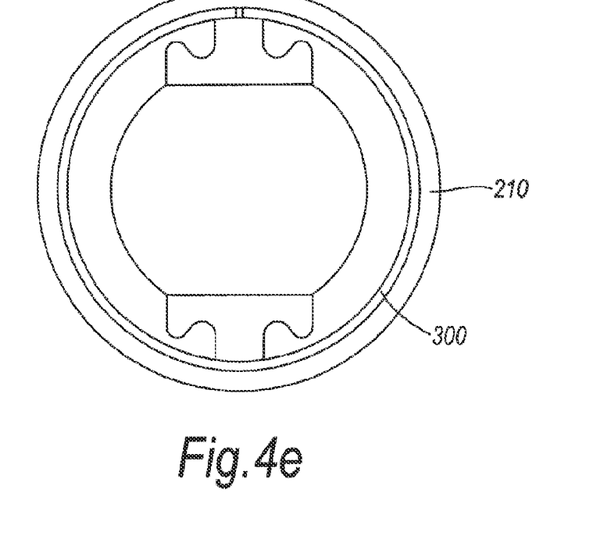

Once the composite has been cured to form the outer section 200, the inner mandrel 430 can be removed by sliding. This is shown in FIG. 4e.

Figure 4F:
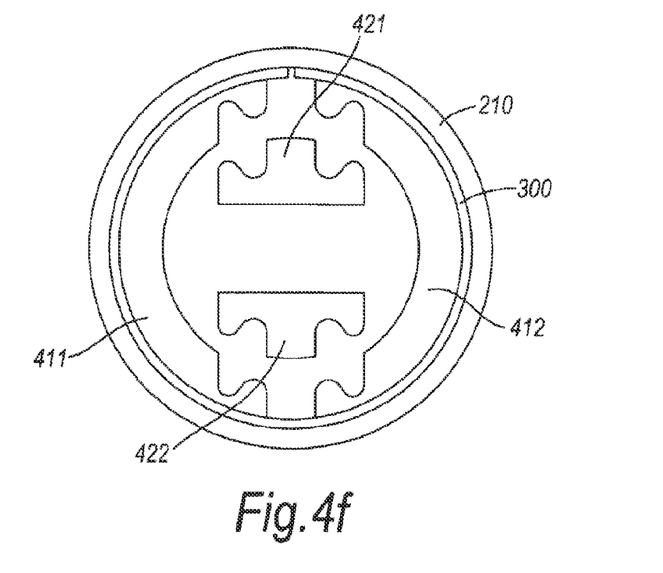

Once the inner mandrel 430 has been removed, the key portions 421 and 422 easily fall out through the centre of the mandrel assembly 400 (where the inner mandrel 430 had been) and can be removed. This is shown in FIG. 4f. The key portions 421 and 422 easily fall out because the notch projections in the key portions and the shell formers have parallel "cut-out" lines extending perpendicularly to the flattened top and bottom of the keys 421,422.

Figure 4G:
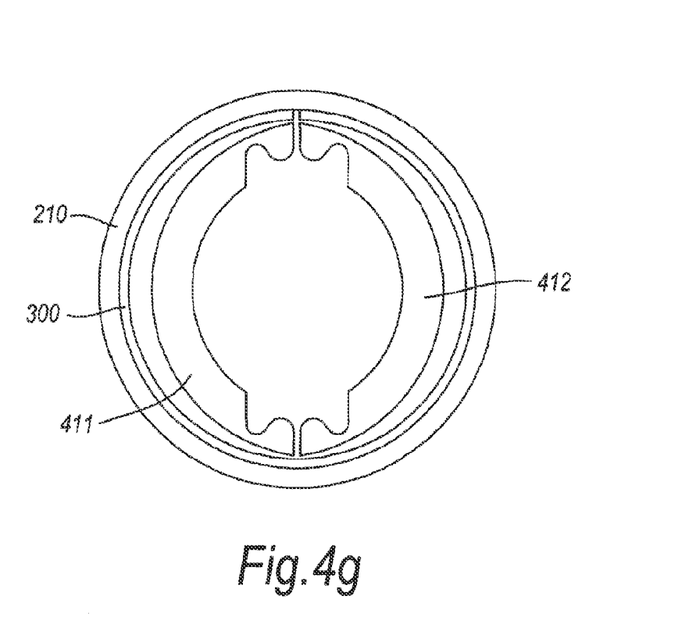
Figure 4H:
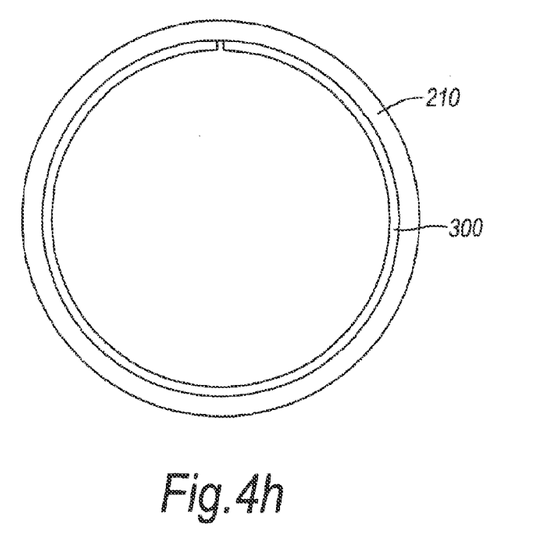

Once the key portions 411, 412 have been removed, the shell formers 411, 412 can be easily removed by squeezing them into the centre of the mandrel assembly 400, as shown in FIG. 4g. Once these shell formers 411, 412 have been removed, the finished component remains. This is shown in FIG. 4h. The finished component has a tape layered composite 210 as its outer section and a riblet foil 300 inside the outer section.

In order to simulate and estimate the refuel times using pipe with the riblets according to an embodiment of the invention, modelling was performed for both a pipe configuration based on an existing gallery system, used in many Airbus aircraft, and a proposed new separate lines system, as disclosed in UK patent application entitled "A Refuel Valve Assembly and Method for Refuelling An Aircraft" with agents reference "XA 3063", having the same filing date as the present application. The contents of that application are fully incorporated herein by reference.

A skin friction reduction of 10% and 20% was assumed based on a known riblet drag reduction and a best case riblet drag reduction capability, respectively. The average skin friction for each fuel system was found in order to give a baseline friction factor. This friction factor was then reduced by 10% and 20%.

Table 1 shows the baseline friction factors for the different fuel systems; the prior art gallery system using a 2 inch pipe diameter and a 1.5 inch pipe diameter and the separate lines system using a 2 inch pipe diameter and a 1.5 inch pipe diameter. The baseline friction factors are then reduced by 10% and 20% to give the known riblet and best case riblet drag reduction cases.

TABLE 1

Friction Factors for Different Cases

|  | Baseline FF | −10% FF | −20% FF |
|---|---|---|---|
| Gallery System - 2" pipe | 0.155 | 0.1395 | 0.0124 |
| Separate Line System - 2" pipe | 0.019 | 0.0171 | 0.0152 |
| Gallery System - 1.5" pipe | 0.0165 | 0.01485 | 0.0132 |
| Separate Line System - 1.5" pipe | 0.0193 | 0.0174 | 0.0154 |

A flow model was then run using "Flowmaster" for the different systems and pipe diameters using the baseline and 10% and 20% reduction friction factors, with a refuel pressure of 50 psig.

Table 2a shows the refuel time for a baseline friction factor and for a reduction of 10% and 20% in the friction factor for the prior art gallery system with a 2 inch diameter pipe. It can be seen that percentage reductions in refuel time of 0.7 and 1.8 are achieved respectively.

TABLE 2a

Flowmaster Modelling Results for Gallery System with 2" pipe

|  | Refuel (psig) | Time(s) | Time(min) | Difference (%) |
|---|---|---|---|---|
| Baseline FF | 50 | 1221 | 20.4 | — |
| −10% FF | 50 | 1212 | 20.2 | −0.7 |
| −20% FF | 50 | 1199 | 20.0 | −1.8 |

Table 2b shows the refuel time for a baseline friction factor and for a reduction of 10% and 20% in the friction factor for the separate lines system with a 2 inch diameter pipe. It can be seen that percentage reductions in refuel time of 0.7 and 1.2 are achieved respectively.

TABLE 2b

Flowmaster Modelling Results for Separate Line System with 2" pipe

|  | Refuel (psig) | Time(s) | Time(min) | Difference (%) |
|---|---|---|---|---|
| Baseline FF | 50 | 886 | 14.8 | — |
| −10% FF | 50 | 880 | 14.7 | −0.7 |
| −20% FF | 50 | 875 | 14.6 | −1.2 |

Table 3a shows the refuel time for a baseline friction factor and for a reduction of 10% and 20% in the friction factor for the prior art gallery system with a 1.5 inch diameter pipe. It can be seen that percentage reductions in refuel time of 2.1 and 4.0 are achieved respectively.

TABLE 3a

Flowmaster Modelling Results for Gallery System with 1.5" pipe

|  | Refuel (psig) | Time(s) | Time(min) | Difference (%) |
|---|---|---|---|---|
| Baseline FF (No Orifice) | 50 | 1727 | 28.8 | — |
| −10% FF | 50 | 1691 | 28.2 | −2.1 |
| −20% FF | 50 | 1658 | 27.6 | −4.0 |

Table 3b shows the refuel time for a baseline friction factor and for a reduction of 10% and 20% in the friction factor for the separate lines system with a 1.5 inch diameter pipe. It can be seen that percentage reductions in refuel time of 1.7 and 3.6 are achieved respectively.

TABLE 3b

Flowmaster Modelling Results for Separate Lines System with 1.5" pipe

|  | Refuel (psig) | Time(s) | Time(min) | Difference (%) |
|---|---|---|---|---|
| Baseline FF | 50 | 1096 | 18.3 | — |
| −10% FF | 50 | 1077 | 18.0 | −1.7 |
| −20% FF | 50 | 1056 | 17.6 | −3.6 |

It can be seen that a greater percentage reduction in refuel time is achieved when a 1.5 inch diameter pipe is used. This is because at lower pipe diameters, the riblet pattern 310 influences a larger proportion of the fuel flow through the pipe.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Figure 3A:
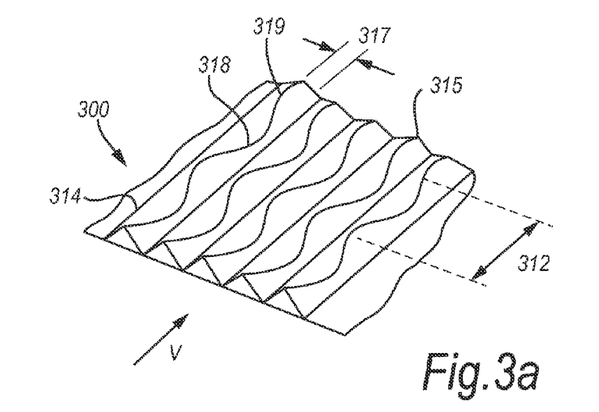
FIGS. 3a and 3b show isometric views of alternative riblet designs according to a second and a third embodiment of the invention.

FIG. 3a shows an isometric view of an alternative riblet pattern 310 according to a second embodiment of the invention. Here the riblets 311 do not have a constant triangular cross-section. Instead, the peaks 315 of the riblets 311 undulate up and down, and side to side (see arrow 317), so that the peaks of the riblets create a streamwise profile of a regularly undulating landscape with valleys 318 and mountains 319. The undulating landscape is such that the wavelength of the riblets (the distance between equivalent points on the profile) is 312. The riblet wavelength 312 can be varied and optimized based on the fuel flow velocity through the pipe. The second embodiment as shown in FIG. 3a is expected to give a drag reduction of 8% to 20%.

Figure 3B:
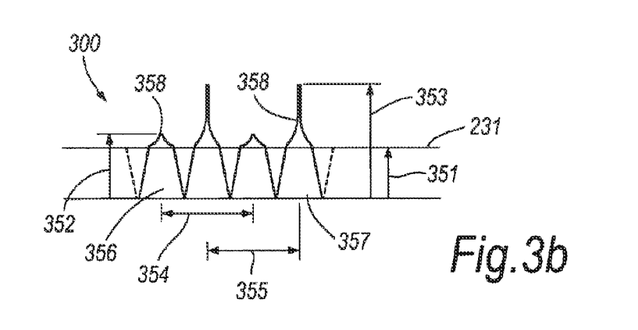

FIG. 3b shows an isometric view of another alternative riblet pattern 310 according to a third embodiment of the invention. Here, the riblets 311 are a series of shorter riblets 356 interspersed with longer riblets 357. The shorter riblets 356 project away from the riblet foil 300 to a height labelled as 352. The large riblets 357 extend further into the centre of the pipe by a height labelled as 353. The spacing between the smaller riblets is labelled as 354 and the spacing between the larger riblets is labelled as 355.

The riblets have a "cusped" top profile 358 such that the shorter riblets 356 extend up to a height of 351 at a constant angle and then have a cusped top between height 351 and height 352. The large riblets 357 are identical to the smaller riblets up to height 351 and from this height they cusp to the tallest height of 353. This riblet pattern 310 produces a virtual surface, labelled as 231.

A further alternative riblet pattern 310 is a sideways sinusoidally undulating pattern such that the riblet peaks 315 undulate tangentially to the interior pipe wall so that the peaks of the riblets create a sinusoidal profile with crests and dips. This riblet pattern is expected to give a drag reduction of up to 12%.

Other alternative riblet configurations are riblets with two-height, multiple height, converging, diverging, varied cross-section, varied streamwise section and even more complex riblet profiles.

Further alternatives are that the pipe diameter could be any diameter in order to cope with the fuel flow and pressure required in different circumstances. For example, in a refuel system, the pipe diameter may be between 1 inch and 3 inches, preferably between 1.5 inches and 2.5 inches.

In addition, the height, spacing and wavelengths, where appropriate, can be optimized. In order to do this, the height and spacing are non-dimensionalised with respect to the pipe diameter, flow kinematic velocity and flow shear velocity, as described previously. The ratio of $h^+$ to $s^+$ is ideally around 2:3. It is anticipated that $h^+$ should be less than 20, ideally between 8 and 12 and that $s^+$ should be less than 30, ideally between 12 and 18.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A pipe for an aircraft refuel system, the pipe comprising: an outer section making up a pipe wall, the pipe wall having an outer pipe wall surface and an inner pipe wall surface, a surface texture on the inner pipe wall surface, the surface texture comprising projections projecting inwards from the inner pipe wall surface towards a center of the pipe, wherein the cross sectional shape of at least one of the projections varies—along the length of the projection, and wherein the peak of at least one projection varies position transversely with respect to the projection, along the length of the projection, such that the peak of the at least one projection undulates sideways along the pipe.

2. The pipe as claimed in claim 1, wherein the surface texture comprises a series of riblets, the riblets being defined as the projections extending longitudinally along the length of the pipe.

3. The pipe as claimed in claim 1, wherein the surface texture is formed from a layer of conductive material.

4. The pipe as claimed in claim 1, wherein the outer section is made from a non-conductive material.

5. The pipe as claimed in claim 4, wherein the outer section is made from a composite material.

6. The pipe as claimed in claim 1, wherein the projections have a substantially triangular cross-section shape.

7. The pipe as claimed in claim 1, wherein the height of at least one projection varies along the length of the projection, such that the projections undulate up and down along the pipe.

8. The pipe as claimed in claim 1, wherein the surface texture is coated in an anti-bacterial coating.

9. An aircraft refuel system comprising a pipe as claimed in claim 1.

10. An aircraft comprising a pipe as claimed in claim 1.

11. A method of manufacturing piping for an aircraft refuel system, the piping including a pipe comprising an outer section making up a pipe wall, the pipe wall having an outer and inner surface, a surface texture on the inner pipe wall surface, the surface texture comprising projections projecting inwards from the inner pipe wall surface towards the center of the pipe, wherein the cross sectional shape of the projections varies along the length of the projections and the peak of at least one projection varies position transversely with respect to the projection, along the length of the projection, such that the peak of the at least one projection undulates sideways along the pipe, wherein, said method comprising the steps of:
applying a surface texture layer around a mandrel, then
applying an outer pipe section layer around the surface texture layer, and then
removing the mandrel.

12. A method of manufacturing piping for an aircraft refuel system, according to claim 11, wherein the surface texture layer is in the form of a foil which is wrapped around the mandrel.

13. A method of manufacturing piping for an aircraft refuel system, according to claim 11, wherein the surface texture layer has an antibacterial coating applied to it, for example, by emersion or by spraying.

14. A method of manufacturing piping for an aircraft refuel system, according to claim 11, wherein suction pressure is applied to the mandrel to retain the surface texture layer on the mandrel.

15. A method of manufacturing piping for an aircraft refuel system, according to claim 11, wherein the outer pipe section layer is applied around the surface texture layer by winding composite un-cured tape around the surface texture layer and wherein the un-cured composite material is then cured.

16. A method of manufacturing piping for an aircraft refuel system, according to claim 11, wherein the mandrel is formed of inner and outer sections, wherein the surface texture layer and outer pipe section layer are applied around the outer section, and wherein the inner section can be removed from inside of the outer section.

17. A method of manufacturing piping for an aircraft refuel system, according to claim 16, wherein the outer mandrel section is at least partially made from open cell foam.

18. A method of manufacturing piping for an aircraft refuel system, according to claim 16, wherein the outer mandrel section is made up from at least two segments linked together, wherein, upon removal of the inner mandrel section, a first segment is removed by moving it in a direction towards the centre of the pipe, and wherein, upon removal of the first segment, the second segment is easily removed.

19. A method of manufacturing piping for an aircraft refuel system, according to claim 18, wherein the inner mandrel section has at least one flattened portion on its outer surface and wherein the first segment has a corresponding flattened portion on its inner surface, such that the inner and outer mandrel sections cannot rotate with respect to each other.

* * * * *